United States Patent
Hanazaki (10) Patent No.: US 10,164,260 B2
(45) Date of Patent: Dec. 25, 2018

(54) POSITIVE ELECTRODE FOR NONAQUEOUS ELECTROLYTE SECONDARY BATTERY AND PRODUCTION METHOD THEREOF

(71) Applicant: TOYOTA JIDOSHA KABUSHIKI KAISHA, Toyota-shi, Aichi (JP)

(72) Inventor: Ryo Hanazaki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 171 days.

(21) Appl. No.: 14/682,333

(22) Filed: Apr. 9, 2015

(65) Prior Publication Data
US 2015/0303480 A1 Oct. 22, 2015

(30) Foreign Application Priority Data
Apr. 18, 2014 (JP) .................. 2014-086669

(51) Int. Cl.
*H01M 4/62* (2006.01)
*H01M 4/1393* (2010.01)
(Continued)

(52) U.S. Cl.
CPC ......... *H01M 4/623* (2013.01); *H01M 4/0404* (2013.01); *H01M 4/1391* (2013.01);
(Continued)

(58) Field of Classification Search
CPC combination set(s) only.
See application file for complete search history.

(56) References Cited

U.S. PATENT DOCUMENTS 6,497,979 B1 * 12/2002 Iijima ................ H01M 4/0404
429/223
6,686,089 B1 * 2/2004 Fujiwara ................ H01M 4/13
429/212
(Continued)

FOREIGN PATENT DOCUMENTS

JP 2010-157361 A 7/2010
JP 2012-186054 A 9/2012
(Continued)

*Primary Examiner* — Imran Akram
(74) *Attorney, Agent, or Firm* — Sughrue Mion, PLLC (57) ABSTRACT

Provided is a method for producing a positive electrode for a nonaqueous electrolyte secondary battery having superior electrical conductivity with high productivity. The production method disclosed herein includes the following steps: a first kneading step (S10) for kneading electrically conductive carbon fine particles and a hydrophobic binder that gels when contacted by water, in N-methyl-2-pyrrolidone (NMP); a second kneading step (S20) for adding a positive electrode active material and water to a first kneaded product obtained in the first kneading step followed by additional kneading; and a step (S30) for forming a positive electrode active material layer on the surface of a positive electrode current collector by coating a second kneaded product obtained in the second kneading step on the positive electrode current collector. The first kneaded product contains moisture, and the ratio of the mass of the moisture to the mass of the NMP is 0.002 or less in the first kneaded product, while in the second kneading step (S20), the water is added at a mass ratio of 0.0022 to 0.0115 based on the mass of the NMP.

19 Claims, 4 Drawing Sheets

(51) Int. Cl.
  *H01M 4/04* (2006.01)
  *H01M 4/1391* (2010.01)
  *H01M 4/131* (2010.01)
  *H01M 10/052* (2010.01)
  *H01M 4/02* (2006.01)

(52) U.S. Cl.
  CPC ............ *H01M 4/625* (2013.01); *H01M 4/131* (2013.01); *H01M 10/052* (2013.01); *H01M 2004/021* (2013.01); *H01M 2004/028* (2013.01)

(56) References Cited

U.S. PATENT DOCUMENTS

| | | | | |
|---|---|---|---|---|
| 2003/0113626 A1* | 6/2003 | Maeda | ............... | H01M 4/621 429/217 |
| 2004/0023115 A1* | 2/2004 | Kato | ............... | H01M 2/0285 429/231.8 |
| 2006/0172196 A1* | 8/2006 | Fukunaga | ........... | H01M 4/134 429/232 |
| 2010/0167125 A1 | 7/2010 | Miyaki et al. | | |
| 2011/0020703 A1* | 1/2011 | Suzuki | ............... | H01M 4/0404 429/221 |
| 2011/0159360 A1* | 6/2011 | Hirota | ................ | H01M 4/624 429/206 |
| 2011/0318638 A1 | 12/2011 | Koh et al. | | |
| 2013/0122366 A1* | 5/2013 | Suzuki | ............... | H01M 4/0404 429/211 |
| 2014/0011064 A1* | 1/2014 | Matsuda | ............ | H01M 4/366 429/94 |
| 2014/0234724 A1* | 8/2014 | Nakamura | ......... | H01M 4/1393 429/232 |
| 2015/0034862 A1* | 2/2015 | Kifune | ............... | H01M 4/1391 252/182.1 |
| 2015/0357648 A1* | 12/2015 | Sugimoto | ............ | H01M 4/139 429/217 |
| 2016/0099461 A1* | 4/2016 | Kishimoto | .............. | H01M 4/04 366/69 |
| 2016/0197350 A1* | 7/2016 | Nishide | ............ | H01M 10/0525 429/152 |

FOREIGN PATENT DOCUMENTS

| | | | | |
|---|---|---|---|---|
| JP | 2014-49390 A | | 3/2014 | |
| KR | 10-2010-0006409 A | | 1/2010 | |
| KR | 10-2011-0111482 A | | 10/2011 | |
| WO | WO 2014184925 A1 * | | 11/2014 | ............. H01M 4/04 |

\* cited by examiner

POSITIVE ELECTRODE FOR NONAQUEOUS ELECTROLYTE SECONDARY BATTERY AND PRODUCTION METHOD THEREOF

TECHNICAL FIELD

The present invention relates to a nonaqueous electrolyte secondary battery. More particularly, the present invention relates to a production method of a positive electrode for the battery.

The present application claims priority on the basis of Japanese Patent Application No. 2014-086669 filed on Apr. 18, 2014, the contents of which are incorporated herein by reference.

BACKGROUND ART

Since lithium ion secondary batteries and other nonaqueous electrolyte secondary batteries are lighter in weight and have higher energy density in comparison with existing batteries, they are preferably used as high output power supplies for vehicle mounting and as so-called portable power supplies and the like.

In general, the electrodes of nonaqueous electrolyte secondary batteries are provided with a current collector and an active material layer formed on the current collector. Electrodes of such a form are fabricated by, for example, preparing a slurry for forming the active material layer, obtained by dissolving or dispersing an active material, binder and the like in a prescribed liquid medium (and including pastes and inks, and to apply similarly hereinafter), and coating the slurry onto the surface of the current collector followed by drying. Examples of prior patent literature relating to methods for fabricating an electrode include Patent Literature 1 and 2. The abstract of Patent Literature 1, for example, describes the preparation of a slurry for forming a positive electrode active material layer by kneading a positive electrode active material, an electrically conductive material and a polyvinylidene fluoride (PVdF)-based binder in a solvent (N-methyl-2-pyrrolidone) for which moisture content has been reduced to 100 ppm or less.

CITATION LIST

Patent Literature

[Patent Literature 1] Japanese Patent Application Laid-open No. 2012-186054
[Patent Literature 2] Japanese Patent Application Laid-open No. 2010-157361

SUMMARY OF INVENTION

However, studies have been conducted in recent years for further increasing the solid content in the slurry during positive electrode production from the viewpoints of improving productivity and reducing costs. However, when the solid content of the slurry is increased, slurry viscosity becomes excessively high and handling and workability during coating may decrease. In order to deal with this, there is a technology that lowers slurry viscosity by highly dispersing an electrically conductive material in the slurry by applying a large amount of energy to the slurry during kneading. However, if this electrically conductive material is excessively dispersed, the network structure of the electrically conductive material is severed and electrically conductive paths may be shortened. In such a case, electrical conductivity within the positive electrode (and more specifically, that within the positive electrode active material layer and between the positive electrode active material layer and the positive electrode current collector) decreases and battery characteristics (and particularly, output characteristics) may decrease.

With the foregoing in view, an object of the present invention is to provide a method for producing a positive electrode for a nonaqueous electrolyte secondary battery having superior electrical conductivity both stably and with high productivity. Another related object of the present invention is to provide a nonaqueous electrolyte secondary battery provided with that positive electrode.

The inventor of the present invention conducted extensive studies from various perspectives to solve the above-mentioned problems. As a result, this led to completion of the present invention.

According to the present invention, a method is provided for producing a positive electrode for a nonaqueous electrolyte secondary battery. This production method includes the following steps: (1) a first kneading step for kneading electrically conductive carbon fine particles and a hydrophobic binder that gels when contacted by water, in N-methyl-2-pyrrolidone (NMP); (2) a second kneading step for adding a positive electrode active material and water to a first kneaded product obtained in the first kneading step followed by additional kneading; and (3) a step for forming a positive electrode active material layer on the surface of a positive electrode current collector by coating a second kneaded product obtained in the second kneading step on the positive electrode current collector. The first kneaded product contains moisture. In the first kneaded product, the ratio of the mass of the moisture to the mass of the NMP is 0.002 or less, while in the second kneading step, the water is added at a mass ratio of 0.0022 to 0.0115 based on the mass of the NMP.

Aggregation of the electrically conductive fine carbon particles can be highly suppressed by making the moisture content of the first kneaded product to be within the above-mentioned range. In addition, the hydrophobic binder can be suitably gelled and an aggregate containing electrically conductive fine carbon particles and positive electrode active material can be formed by making the moisture content of the second kneading step to be within the above-mentioned range. As a result, a network is formed between the electrically conductive fine carbon particles and the positive electrode active material, and electrically conductive paths can be formed efficiently. Moreover, according to this production method, since the solid content during kneading can be set to a high level, cost reductions and a reduction in the burden on the environment attributable to a reduction in the amount of solvent (NMP) used, and improvement of productivity resulting from shortening of the drying step, can be realized simultaneously. Thus, according to the present invention, a positive electrode having superior electrical conductivity can be stably fabricated with high productivity.

Furthermore, "moisture content" in a kneaded product can be measured by a moisture vaporization (heating temperature: 120° C., heating time: 30 minutes)-Karl Fischer titration method. More specifically, a measurement sample (first kneaded product) is heated in a dry nitrogen gas atmosphere to vaporize moisture (water) contained in the measurement sample. The vaporized moisture is then quantified by Karl Fischer titration (and typically, coulometric titration). As a result, the moisture content in the measurement sample can be determined.

In a preferable aspect of the production method disclosed herein, the ratio of the mass of the hydrophobic binder to the mass of the NMP in the first kneading step is 0.024 to 0.026.

As a result, even stronger electrically conductive paths can be formed in the positive electrode and even lower resistance can be realized. In addition, a highly durable positive electrode can be realized that is resistant to the occurrence of separation and elimination of the positive electrode active material layer.

A polymer material that disperses or dissolves in a nonaqueous solvent (and typically, an organic solvent), such as polyvinylidene fluoride (PVdF), can be preferably used for the hydrophobic binder. In addition, highly electrically conductive carbon black, such as acetylene black, can be preferably used for the electrically conductive carbon fine particles.

A positive electrode obtained by the production method has low resistance and superior electrical conductivity. In addition, it can also have high durability that is resistant to the occurrence of separation and elimination of the positive electrode active material layer. For example, the 90° peel strength (based on JIS-K6854-1 (1999), to apply similarly hereinafter) of the positive electrode active material layer from the positive electrode current collector can be 3.5 N/m or more. Thus, in a nonaqueous electrolyte secondary battery provided with the positive electrode, superior battery characteristics (such as output density or energy density) can be stably demonstrated over a long period of time.

DESCRIPTION OF EMBODIMENTS

The following provides an explanation of preferred embodiments of the present invention. Furthermore, matters other than those specifically mentioned in the present description that are required to carry out the present invention (such as battery constituents (e.g., negative electrode and nonaqueous electrolyte) or ordinary production processes not characterizing the present invention) can be understood by a person with ordinary skill in the art to be design matters based on the related art in the relevant field. The present invention can be carried out based on the contents disclosed in the present description and common general technical knowledge in the relevant field.

<<Production Method of Positive Electrode for Nonaqueous Electrolyte Secondary Battery>>

Figure 1:
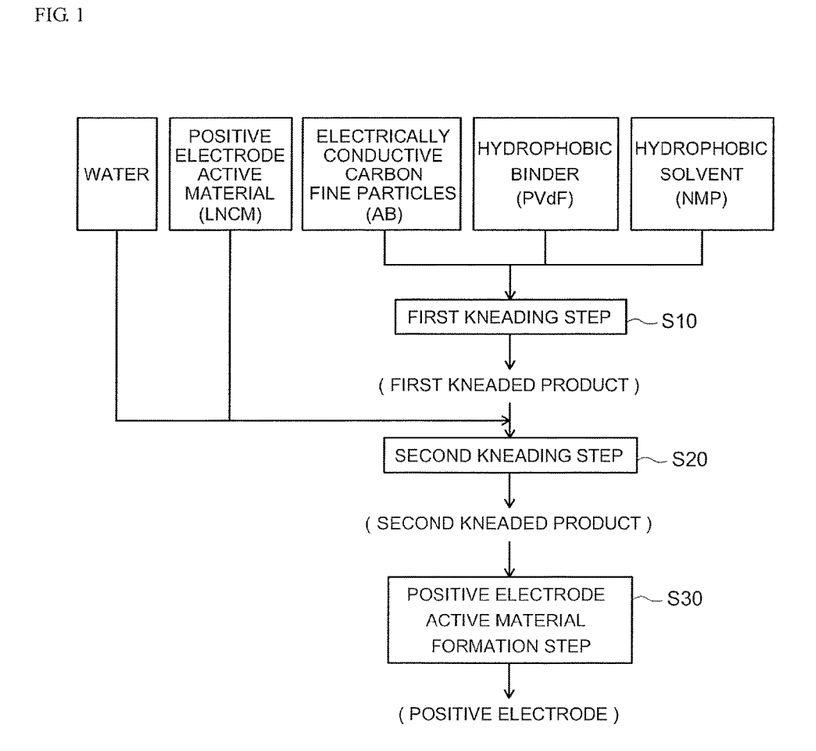
FIG. 1 is a flow chart showing a method for producing a positive electrode for a nonaqueous electrolyte secondary battery according to one embodiment.

As shown in flow chart of FIG. 1, the production method of a positive electrode for a nonaqueous electrolyte secondary battery disclosed herein generally includes the following three steps:

(S10) a first kneading step for kneading electrically conductive carbon fine particles and a hydrophobic binder in N-methyl-2-pyrrolidone (NMP);

(S20) a second kneading step for adding a positive electrode active material and a prescribed amount of water to a first kneaded product obtained in the first kneading step followed by additional kneading; and (S30) a step for forming a positive electrode active material layer on the surface of a positive electrode current collector by coating a second kneaded product obtained in the second kneading step onto the positive electrode current collector.

This production method is characterized in that the moisture (water) content is highly controlled in each of the kneading steps of (S10) and (S20). Thus, there are no particular limitations on other conditions and can be suitably determined corresponding to various objectives and applications.

The following provides a sequential explanation of each step.

<S10: First Kneading Step>

In the production method disclosed herein, electrically conductive carbon fine particles and a hydrophobic binder that gels when contacted by water are first kneaded in a liquid medium in the form of N-methyl-2-pyrrolidone (NMP). At least one of the electrically conductive carbon fine particles, the hydrophobic binder and the NMP typically contains moisture. In the present step, it is imperative to control the ratio of the mass of the moisture to the mass to the NMP (moisture/NMP) to 0.002 or less.

Electrically conductive carbon fine particles exhibit powerful cohesive force. Consequently, if a large amount of moisture is contained in the present step, clumps form in the solvent (NMP) or a plurality of particles aggregate, easily resulting in the formation of aggregates on the order of several tens to several hundreds of micrometers in size. According to a study conducted by the inventor of the present invention, this results in electrically conductive paths not being formed efficiently between the electrically conductive fine particles and positive electrode active material in the second kneading step (S20) to be subsequently described, thereby resulting in the risk of an increase in resistance when a battery is constructed. In the production method disclosed herein, this formation of aggregates is suppressed and the electrically conductive carbon fine particles are uniformly dispersed in NMP by holding the moisture content to 0.002 or less relative to the amount of NMP.

One type or two or more types of carbon materials conventionally used in nonaqueous electrolyte secondary batteries can be used without limitation for the electrically conductive carbon fine particles. Preferable examples thereof include various types of carbon black (such as acetylene black (AB), furnace black, Ketjen black (KB), channel black, lamp black or thermal black), coke, activated charcoal, graphite powder, carbon fiber (such as PAN-based carbon fiber or pitch-based carbon fiber) and carbon nanotubes. Among these, carbon black, in particular, acetylene black can be used preferably.

Electrically conductive carbon fine particles having the property of easily forming a chain-like or cluster-like structure, in which primary particles are connected to a certain degree, are preferable for the electrically conductive carbon fiber particles from the viewpoint of realizing favorable electrical conductivity. This string of primary particles is also referred to as a structure. The degree of development of this structure can be determined by measuring particle size distribution (by dynamic light scattering) or observing with an electron microscope (either a scanning or transmission type can be used). Electrically conductive fine particles that easily form a structure in which the primary particles are connected are able to effectively form favorable electrically conductive paths between positive electrode active material particles. Consequently, superior electrical conductivity can be imparted to the positive electrode active material layer while using a smaller amount of electrically conductive carbon fine particles in the second kneading step (S20) to be subsequently described. On the other hand, since fine particles having such a structure easily become entangled or curled in a solvent, making it difficult to disperse the particles both evenly and uniformly. From this viewpoint, the electrically conductive carbon fiber particles preferably have a primary structure diameter (also referred to as aggregate diameter) of about 0.01 μm to 3 μm and more preferably 0.01 μm to 0.1 μm.

In addition, it is preferable that the specific surface area of the electrically conductive carbon fiber particles is normally within the range of 1 to 1000 $m^2/g$, for example, 10 to 500 $m^2/g$, and typically 10 to 100 $m^2/g$. In general, the larger the specific surface area, the greater the increase in contact area with the positive electrode active material, and electrically conductive paths are more easily formed between the positive electrode active material particles. On the other hand, since fine particles having a large specific surface area tend to have high bulk, they tend to cause a decrease in energy density. Both favorable electrical conductivity and high energy density can be realized at a high level by making specific surface area to be within the above-mentioned ranges.

Furthermore, specific surface area obtained by analyzing a value measured according to the nitrogen adsorption method using the BET method (BET specific surface area) can be used for specific surface area.

As has been previously described, bulk density of the electrically conductive carbon fine particles is preferably comparatively low from the viewpoint of high energy density, and is typically within the range of 0.01 to 0.5 $g/cm^3$, and for example, 0.01 to 0.3 $g/cm^3$.

Furthermore, a measured value as defined in JIS K1469 (2003) can be used for bulk density.

In particular, electrically conductive carbon fine particles that satisfy one or two or more of the above-mentioned preferable properties, namely degree of structure development, specific surface area and bulk density, can be used particularly preferably. Examples of such electrically conductive carbon fine particles include carbon black such as acetylene black or Ketjen black. Acetylene black in particular tends to easily form a structure in which primary particles are connected. Consequently, favorable electrical conductivity can be realized while using a comparatively small amount, thereby making this preferable. In addition, since uniformly dispersing in NMP is difficult, the application of the present invention can be said to be particularly effective.

The hydrophobic binder is a binder that gels when contacted by water, and one type or two or more types of substances conventionally used in nonaqueous electrolyte secondary batteries can be used without any particular limitations. Typical examples thereof include various types of polymer materials that disperse or dissolve in a nonaqueous solvent. Preferable examples thereof include polyvinylidene fluoride (PVdF), polyvinylidene chloride (PVdC) and polyethylene oxide (PEO).

Furthermore, the concept of PVdF as referred to here can include homopolymers of vinylidene fluoride as well as copolymers of vinylidene fluoride and other monomers, denatured forms thereof, modified forms thereof and the like. In the above-mentioned copolymers, monomers able to be copolymerized with vinylidene fluoride can be one type or two or more types selected from among, for example, fluorine-based monomers such as vinyl fluoride, ethylene trifluoride, ethylene trifluorochloride, chlorotrifluoroethylene, ethylene tetrafluoride or propylene hexafluoride, and non-fluorine-based monomers such as ethylene, methyl methacrylate or acrylic acid. The copolymerization rate of vinylidene fluoride in the copolymer is preferably 50% by mass or more (and typically, 70% by mass or more, and for example, 85% by mass or more). Examples of the above-mentioned denatured forms include carboxylic acid denatured forms of homopolymers and copolymers of vinylidene fluoride.

Nonaqueous N-methyl-2-pyrrolidone (NMP) is used for the liquid medium (hydrophobic solvent). In the production method disclosed herein, the amount of NMP used is reduced from viewpoints such as reducing costs, reducing the burden on the environment and improving productivity. The amount of solvent (NMP) used is normally 800 to 1200 parts by mass, and preferably 900 to 1100 parts by mass, based on 100 parts by mass of electrically conductive carbon fine particles. As a result, there is the effect of strongly adsorbing the hydrophobic binder to the surface of the electrically conductive carbon fine particles. As a result thereof, the adhesiveness and durability (mechanical strength) of the positive electrode can be improved.

The mass ratio of the hydrophobic binder to the electrically conductive carbon fine particles is normally about 1:2 to 1:6 and preferably about 1:3 to 1:5. As a result, a positive electrode can be realized that is capable of demonstrating both electrical conductivity and mechanical strength at a high level.

In addition, in a preferable aspect, the mass ratio of the amount of the hydrophobic binder used to the amount of the solvent (NMP) used is made to be 0.24 to 0.26. If the amount of hydrophobic binder used is excessively small, the degree of gelling in the second kneading step (S20) to be subsequently described becomes small and the effects of the present invention may be diminished. In addition, integration of the positive electrode active material layer and adhesiveness between the positive electrode active material layer and positive electrode current collector may be reduced and durability may decrease. On the other hand, if the amount of hydrophobic binder used is excessively large, since the proportion of the surface of the positive electrode active material that is covered by the hydrophobic binder becomes high, electrical conductivity of the positive electrode active material layer decreases, and this may lead to an increase in resistance. As a result of being within the above-mentioned range, the effects of the present invention can be demonstrated more stably and at a higher level.

Furthermore, in the present step, various types of additives such as a dispersant may be added in addition to the electrically conductive fine particles and the hydrophobic binder for the purpose of improving handling, dispersion stability and the like. For example, polymeric compounds having a hydrophobic chain and hydrophilic chain (generally alkaline salts and typically sodium salts), anionic compounds having a sulfate, sulfonate or phosphate, and cationic compounds such as amines can be used as dispersants. Preferable examples thereof include polymeric materials such as carboxymethyl cellulose. The addition of a dispersant makes it possible to more properly control the high dispersibility (degree to which the primary particles are connected) of the electrically conductive carbon fine particles.

Various conventionally known types of stirring and kneading apparatuses such as a ball mill, roll mill, mixer, disperser or kneader can be suitably used for kneading. As a result of kneading, hydrophobic binder can be strongly adsorbed to the surface of the electrically conductive carbon fine particles. In addition, although electrically conductive carbon fine particles ordinarily have the property of easily aggregating in solvent, as a result of kneading, secondary particles of the electrically conductive carbon fine particles are suitably broken up enabling the first kneaded product to be adjusted to low viscosity. Moreover, the electrically conductive carbon fine particles can be prevented from forming coarse aggregates. As a result, favorable coatability can be secured.

The preferable kneading time during kneading is the amount of time during which the electrically conductive carbon fine particles and hydrophobic binder are uniformly dispersed in NMP. Although varying according to apparatus configuration and kneading conditions, kneading time is normally about 10 minutes to 3 hours, and preferably 10 minutes to 30 minutes from the viewpoint of improving productivity.

Although there are no particular limitations on the properties of the first kneaded product obtained in this manner, the solid concentration (NV), for example, is adjusted to about 5 to 20%, typically 7% or more and preferably 10% from the viewpoint of improving productivity and reducing costs.

Moreover, in the production method disclosed herein, electrically conductive carbon fine particles are highly dispersed in NMP for which moisture content has been controlled. As a result, viscosity of the kneaded product can be held to a low level. In addition, viscosity of the first kneaded product is adjusted to about 100 to 300 mPa·s.

Furthermore, a measured value (25° C.) as defined by JIS K7117 (1999) using a B-type viscometer can be used for viscosity.

<S20: Second Kneading Step>

In the production method disclosed herein, a positive electrode active material and water are next added to the first kneaded product followed by additional kneading. In the present step, it is imperative that water be added at mass ratio of 0.0022 to 0.0115 based on the mass of the NMP.

In the case of typical electrode fabrication methods, gelling of binder is suppressed and uniformity of the kneaded product is maintained by, for example, reducing the moisture content of the solvent. However, in such cases, if, for example, the solid concentration of the first kneaded product is increased, since the network of electrically conductive carbon fine particles remains severed due to the application of energy (shear stress), electrically conductive paths are shortened. As a result, electron conductivity within the positive electrode active material and/or between the positive electrode active material layer and the positive electrode current collector decreases when the positive electrode active material layer is formed, thereby resulting in the risk of an increase in battery resistance.

Therefore, in the production method disclosed herein, the hydrophobic binder is intentionally made to swell by adding an amount of water that is sufficient for allowing the hydrophobic binder to gel (namely, at a mass ratio of 0.0022 or more (2200 ppm or more) based on the mass of NMP). As a result, aggregates of, for example, several tens to several hundreds of micrometers can be formed while incorporating the electrically conductive carbon fine particles and positive electrode active material. Namely, complexes of electrically conductive carbon fine particles and positive electrode active material can be formed while maintaining a lowly dispersed state of the electrically conductive carbon fine particles. As a result, the surface (periphery) of the positive electrode active material is uniformly covered by electrically conductive fine particles having a small particle diameter, and an electrically conductive network can be efficiently constructed between the electrically conductive carbon fine particles and the positive electrode active material. As a result, a positive electrode can be obtained in which resistance is reduced in comparison with the case of not adding water in the present step.

On the other hand, if the amount of water added is excessively high, gelling of the binder proceeds excessively and aggregates become excessively large, thereby resulting in the risk of the electrically conductive carbon fine particles being unable to efficiently cover the surface of the positive electrode active material. As a result, electrical conductivity of the positive electrode decreases and resistance increases, thereby resulting in the risk of a reduction in the effective area of the positive electrode active material and a decrease in capacity. Thus, the amount of water added is 0.0115 or less (11500 ppm or less) based on the mass of NMP.

Furthermore, if moisture is present in an ordinarily fabricated electrode, it can cause exacerbation of resistance. However, the boiling point of the water added in the present step is roughly 100° C., which is considerably lower than the boiling point of NMP (roughly 202° C.). Consequently, the water is preferentially removed over the NMP by drying following the step for forming the positive electrode active material layer (S30) to be subsequently described. Thus, the water does not cause this problem (exacerbation of resistance).

One type or two or more types of various materials known to be able to be used as positive electrode active materials of nonaqueous electrolyte secondary batteries can be used for the positive electrode active material. Preferable examples thereof include stratified or spinel-based lithium compound metal oxides such as $LiNiO_2$, $LiCoO_2$, $LiMn_2O_4$, $LiFeO_2$, $LiNi_{0.5}Mn_{1.5}O_4$, $LiCrMnO_4$ or $LiFePO_4$. Among these, lithium-nickel-cobalt-manganese compound oxides having a stratified structure (and typically, a stratified rock salt structure) are preferable from the viewpoints of improved maintenance of thermal stability and high energy density.

Lithium compound metal oxides fabricated by a conventionally known method can be used as is for the lithium compound metal oxide. Although there are no particular limitations on the properties thereof, the average particle diameter ($D_{50}$), for example, is 1 to 25 μm and those having an average particle diameter of 2 to 10 μm can be used preferably. As a result, the electrically conductive fine particles can be preferably arranged in the gaps between positive electrode active material particles. As a result, electrical conductivity within the positive electrode active material layer can be further improved.

Furthermore, a particle diameter equivalent to a cumulative frequency of 50% by volume from the side of fine particles having a small particle diameter in a volume-based particle size distribution based on an ordinary laser diffraction-light scattering method (also referred to as $D_{50}$ or median diameter) can be used for average particle diameter.

The mass ratio of positive electrode active material to electrically conductive carbon fine particles is normally about 1:0.07 to 1:0.11 and preferably about 1:0.08 to 1:0.10.

As a result, a positive electrode can be realized that is capable of realizing both electrical conductivity and energy density at a high level.

Alternatively, the mass ratio of positive electrode active material to hydrophobic binder is normally about 1:0.01 to 1:0.04 and preferably about 1:0.02 to 1:0.03. As a result, a positive electrode can be realized that demonstrates superior mechanical strength.

Furthermore, various conventionally known stirring and kneading apparatuses as previously described can be suitably used for the kneading apparatus. In addition, the kneading apparatus may be the same as or different from that used in the first kneading step (S10).

A second kneaded product obtained in this manner is adjusted to have properties that are suitable for coating to be subsequently described. The addition of a suitable solvent can be carried out in order to achieve this objective. NMP or a nonaqueous solvent capable of uniformly mixing with the NMP can be used for the solvent.

Although there are no particular limitations on the properties of the second kneaded product, the solid concentration (NV), for example, is about 40 to 80%, and from the viewpoint of improving productivity (such as shortening drying time), is adjusted to 50% or more and preferably 50 to 60%.

In addition, the viscosity of the second kneaded product is adjusted to about 1000 to 7000 mPa·s (and for example, 2000 to 4000 mPa·s). As a result of adjusting to such a viscosity, stability (storability) of the kneaded product can be improved. As a result, even in the case of using a kneaded product for which a certain amount of time has elapsed from the time of preparation, for example, coating streaks or uneven thickness and the like can be inhibited from occurring in the step for forming the positive electrode active material layer (S30) to be subsequently described. Thus, a uniform positive electrode active material layer can be stably formed.

<S30: Positive Electrode Active Material Formation Step>

In the production method disclosed herein, the second kneaded product is next coated onto a positive electrode current collector to form a positive electrode active material layer on the surface of the positive electrode current collector. Since electrically conductive carbon fine particles are maintained in a lowly dispersed state in the second kneaded product, there are few coarse aggregates, coatability is favorable, and problems during coating are unlikely to occur. Consequently, the positive electrode active material layer can be precisely formed.

An electrically conductive member made of a metal having favorable electrical conductivity (such as aluminum or nickel) can be preferably used for the positive electrode current collector. In addition, a conventionally known coating apparatus such as a slit coater, die coater, comma coater, gravure coater or dip coater can be suitably used to coat the kneaded product.

Although there are no particular limitations thereon, the mass of the positive electrode active material layer coated per unit area of the positive electrode current collector (mass on one side in a configuration having the positive electrode active material layer on both sides of the positive electrode current collector) is, for example, 3 mg/cm$^2$ or more, for example, 5 mg/cm$^2$ or more and typically 7 mg/cm$^2$ or more from the viewpoint of realizing high energy density. From the viewpoint of realizing superior output characteristics, the mass of the positive electrode active material layer per side of the positive electrode current collector is 100 mg/cm$^2$ or less, for example, 70 mg/cm$^2$ or less and typically 50 mg/cm$^2$ or less.

In a typical aspect, moisture and solvent (NMP) contained in the kneaded product are subsequently removed by drying the positive electrode active material layer with a suitable drying means. More specifically, the water added in the second kneading step (S20) is first removed by drying, followed by removal of NMP, having a higher boiling point than water, by drying. Air drying, blow drying, low humidity drying, vacuum drying or infrared drying and the like can be used alone or in a suitable combination when drying the positive electrode active material layer.

The proportion of positive electrode active material in the entire positive electrode active material layer is suitably made to be roughly 50% by mass or more (and typically, 60 to 95% by mass) from the viewpoint of realizing high energy density, and that proportion is normally about 80 to 95% by mass. The proportion of electrically conductive carbon fine particles in the entire positive electrode active material layer can be, for example, 1 to 20% by mass, and is normally about 2 to 10% by mass, from the viewpoint of realizing both output characteristics and energy density at a high level. The proportion of hydrophobic binder in the entire positive electrode active material layer can be, for example, about 0.5 to 10% by mass, and is normally about 1 to 5% by mass, from the viewpoint of securing mechanical strength (shape retention).

Furthermore, properties of the positive electrode active material layer such as thickness or density can be adjusted by carrying out suitable press treatment (by a method such as roll pressing or platen pressing) after drying. Average thickness per side of the positive electrode active material layer is, for example, 20 μm or more (and typically, 40 μm or more), and 100 μm or less (and typically, 80 μm or less). In addition, density of the positive electrode active material layer is, for example, 1.0 g/cm$^3$ or more (and typically, 2.0 g/cm$^3$ or more) and 4.5 g/cm$^3$ or less (and typically, 4.0 g/cm$^3$ or less). As a result, high energy density, high output density and superior mechanical strength can be provided at an even higher level.

The positive electrode for a nonaqueous electrolyte secondary battery can be obtained in this manner. This positive electrode demonstrates reduced internal resistance as well as superior durability (mechanical strength in terms of, for example, integration of the positive electrode current collector and positive electrode active material layer). For example, peel strength of the positive electrode active material layer from the positive electrode current collector is preferably 3 N/m or more and more preferably 3.5 N/m or more. In applications requiring strength in particular, peel strength is 3.7 N/m or more, and for example, 3.8 N/m or more.

<Nonaqueous Electrolyte Secondary Battery>

The positive electrode can be preferably used to construct a nonaqueous electrolyte secondary battery. Namely, according to the present invention, a nonaqueous electrolyte secondary battery is provided that is provided with the positive electrode, a negative electrode and a nonaqueous electrolyte.

The negative electrode is typically provided with a negative electrode current collector and a negative electrode active material layer formed on the negative electrode current collector. An electrically conductive material made of a metal having favorable electrical conductivity (such as copper or nickel) is preferable for the negative electrode current collector.

The negative electrode active material layer at least contains a negative electrode active material. Carbon materials such as graphite, non-graphitizable carbon (hard carbon) or graphitizable carbon (soft carbon) can be considered for use as the negative electrode active material, and a graphite-based carbon material in particular (such as a carbon material in which graphite accounts for 50% by mass or more of the total mass of the negative electrode active material) is preferable. In addition, the negative electrode active material layer can contain as necessary one type or two or more types of materials able to be used as constituents of the negative electrode active material layer in an ordinary nonaqueous electrolyte secondary battery in addition to the negative electrode active material. Examples of such materials include binders and various types of additives. Preferable examples of binders include styrene-butadiene rubber (SBR) and polytetrafluoroethylene (PTFE). Preferable examples of thickeners include cellulose-based materials of carboxymethyl cellulose (CMC).

The nonaqueous electrolyte is typically a liquid at normal temperature (for example, 25° C.) and is preferably always a liquid over the temperature range at which it is used (for example, −30 to 60° C.). A nonaqueous electrolyte containing a supporting salt (such as a lithium salt in a lithium ion secondary battery) in a nonaqueous solvent can be preferably used for the nonaqueous electrolyte.

A supporting salt similar to that of an ordinary nonaqueous electrolyte secondary battery can be suitably selected and used for the supporting salt provided it contains a charge carrier (such as lithium ions, sodium ions or magnesium ions, and lithium ions in the case of a lithium ion secondary battery). For example, in the case the charge carrier consists of lithium ions, examples of supporting salts include lithium salts such as $LiPF_6$ or $LiBF_4$. The concentration of supporting salt in the nonaqueous electrolyte is, for example, 0.7 to 1.3 mol/L.

<<One Embodiment of Nonaqueous Electrolyte Secondary Battery>>

Figure 2:
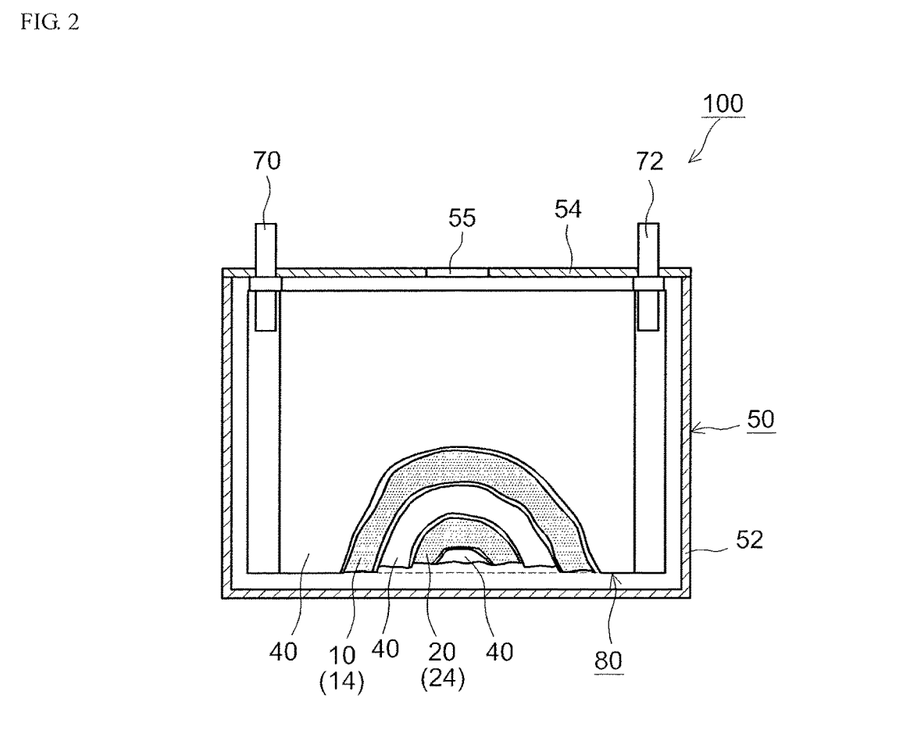
FIG. 2 is a longitudinal cross-sectional view schematically representing a nonaqueous electrolyte secondary battery according to one embodiment.

Although not intended as being particularly limiting, the nonaqueous electrolyte secondary battery (single cell) schematically indicated in FIG. 2 is used as an example to explain the approximate configuration of one embodiment of the present invention. In the following drawings, the same reference symbols are used to indicate those members or sites demonstrating the same action, and duplicate explanations thereof are omitted or simplified. The dimensional relationships in each drawing (such as length, width and thickness) do not necessarily reflect actual dimensional relationships.

FIG. 2 is a longitudinal cross-sectional view schematically showing the cross-sectional structure of a nonaqueous electrolyte secondary battery 100. The nonaqueous electrolyte secondary battery 100 has an electrode body (wound electrode body) 80, in which an elongated positive electrode sheet 10 and an elongated negative electrode sheet 20 are wound flat with an elongated separator sheet 40 interposed therebetween, and a nonaqueous electrolyte not shown, the electrode body 80 and the nonaqueous electrolyte being housed in a battery case 50 having a shape allowing the wound electrode body to be housed (flat box shape).

The battery case 50 is provided with a battery case body 52 in the shape of a flat rectangular parallelepiped (box shape) of which the upper end thereof is open, and a cover 54 that covers the opening. The upper surface of the battery case 50 (namely, the cover 54) is provided with a positive electrode terminal 70 for external connection, which is electrically connected to the positive electrode of the wound electrode body 80, and a negative electrode terminal 72, which is electrically connected to the negative electrode of the wound electrode body 80. The cover 54 is also provided with a safety valve 55 for discharging gas generated within the battery case 50 outside the case 50 in the same manner as a battery case of a conventional nonaqueous electrolyte secondary battery.

The flat wound electrode body 80 is housed within the battery case 50 together with a nonaqueous electrolyte not shown. The wound electrode body 80 is provided with an elongated sheet-shaped positive electrode (positive electrode sheet) 10 and an elongated sheet-shaped negative electrode (negative electrode sheet) 20. The positive electrode sheet 10 is provided with an elongated positive electrode current collector and a positive electrode active material layer 14 formed along the lengthwise direction on at least one surface thereof (and typically on both sides). The negative electrode sheet 20 is provided with an elongated negative electrode current collector and a negative electrode active material layer 24 formed along the lengthwise direction on at least one surface thereof (and typically on both sides). In addition, two elongated sheet-shaped separators 40 are arranged between the positive electrode active material layer 14 and the negative electrode active material layer 24 in the form of insulating layers that prevent direct contact between the two. In addition to insulating the positive electrode and negative electrode, the separators 40 have the functions of retaining and shutting down the nonaqueous electrolyte. Preferable examples thereof include porous resin sheets (films) formed of a resin such as polyethylene (PE), polypropylene (PP), polyester, cellulose or polyamide.

The positive electrode active material layer 14 formed on a surface of the positive electrode current collector and the negative electrode active material layer 24 formed on a surface of the negative electrode current collector overlap in the center of the wound electrode body 80 in the direction of width defined as the direction from one end to the other end in the winding axial direction of the wound electrode body 80, resulting in the formation of a densely laminated wound core. In addition, a positive electrode active material non-formed portion of the positive electrode sheet 10 and a negative electrode active material non-formed portion of the negative electrode sheet 20 are respectively protruding to the outside from the wound core on both ends in the winding axial direction of the wound electrode body 80. The positive electrode current collector is attached to the protruding portion on the positive electrode side, while the negative electrode current collector is attached to the protruding portion on the negative electrode side, and these are electrically connected to the positive electrode terminal 70 and the negative electrode terminal 72, respectively.

<<Applications of Nonaqueous Electrolyte Secondary Battery>>

Although the nonaqueous electrolyte secondary battery disclosed herein can be used in various applications, it is characterized in that both high output density and high durability can be realized at a higher level in comparison with the related art due to the effects of reducing resistance of the positive electrode and superior durability (mechanical strength). Thus, the nonaqueous electrolyte secondary battery disclosed herein can be particularly preferably used in applications requiring high output density and high durability by taking advantage of this characteristic. Examples of such applications include motive power supplies for driving a motor installed in a vehicle such as a plug-in hybrid vehicle (PHV), hybrid vehicle (HV) or electric vehicle (EV). Furthermore, this nonaqueous electrolyte secondary battery can typically be used in the form of a battery pack by connecting a plurality thereof in series and/or in parallel.

Although the following provides an explanation of several examples relating to the present invention, the present invention is not intended to be limited to that indicated in these specific examples.

[Fabrication of Positive Electrodes]

Here, 25 types of positive electrodes (Examples 1 to 25) were fabricated in accordance with the flow chart shown in FIG. 1.

In the first kneading step (S10), electrically conductive fine particles in the form of acetylene black (AB, trade name: "HS-100®", Denki Kagaku Kogyo Kabushiki Kaisha) and a binder in the form of polyvinylidene fluoride (PVdF, trade name: Kureha KF Polymer® #7300", Kureha Corp.) were first gently mixed so that the mass ratio of these materials was roughly such that the ratio of PVdF to AB was 1:4. Solvent in the form of N-methylpyrrolidone (NMP) was then added thereto so that the mass ratio of PVdF to NMP was as shown in Table 1, followed by stirring and mixing for 30 minutes at a rotating speed of 3000 rpm using an ultra-high-speed multi-mixing system ("Robomix®", Primix Corp.) to obtain a first kneaded product. Furthermore, the solid content of the first kneaded product was roughly 10 to 20% by mass, and viscosity (25° C.) was roughly 100 to 300 mPa·s. In addition, the moisture content of the first kneaded product when measured according to the Karl Fischer method (heating temperature: 120° C.) was such that the mass ratio of moisture based on the amount of NMP was roughly 0.001 to 0.018, and satisfied the relationship of (moisture/NMP)≤0.0020 in all cases.

In the second kneading step (S20), a positive electrode active material in the form of $LiNi_{1/3}Co_{1/3}Mn_{1/3}O_2$ (LNCM, average particle diameter: 6 μm, specific surface area: 0.7 m²/g) was added to the first kneaded product obtained as described above so that the ratio of LNCM to PVdF was 1:0.025. Next, an amount of water (ion exchange water) was added so that the ratio of water to NMP was as shown in Table 1, followed by stirring and mixing for 30 minutes at a rotating speed of 3000 rpm to obtain a second kneaded product. Furthermore, the solid content of the second kneaded product was roughly 50 to 60% by mass, and viscosity (25° C.) was roughly 2000 to 4000 mPa·s.

TABLE 1

Material Mixing Ratios (Mass Ratios)

| | | (S10) PVdF/NMP | | | | |
|---|---|---|---|---|---|---|
| Test Examples | | 0.020 | 0.024 | 0.025 | 0.026 | 0.030 |
| (S20) Water/NMP | 0.0020 | Ex. 1 | Ex. 6 | Ex. 11 | Ex. 16 | Ex. 21 |
| | 0.0022 | Ex. 2 | Ex. 7 | Ex. 12 | Ex. 17 | Ex. 22 |
| | 0.0069 | Ex. 3 | Ex. 8 | Ex. 13 | Ex. 18 | Ex. 23 |
| | 0.0115 | Ex. 4 | Ex. 9 | Ex. 14 | Ex. 19 | Ex. 24 |
| | 0.0120 | Ex. 5 | Ex. 10 | Ex. 15 | Ex. 20 | Ex. 25 |

In the positive electrode active material layer formation step (S30), the second kneaded product obtained in the manner described above was coated onto a positive electrode current collector in the form of aluminum foil at a mass per unit area of 13.5 mg/cm² per side, followed by drying (drying temperature: 80° C., drying time: 5 minutes) to form a positive electrode active material layer on the surface of one side of the aluminum foil. Furthermore, the average thickness of the positive electrode active material layer was roughly 50 μm.

As a result, positive electrodes (Examples 1 to 25) for a nonaqueous electrolyte secondary battery were fabricated.

[Measurement of Peel Strength]

Adhesiveness between the current collector and active material layer of the positive electrodes fabricated in the manner described above was evaluated. More specifically, a 90° peel test as defined in JIS-K6854-1 (1999) was carried out on the positive electrodes. The results are shown in Table 2 and FIG. 3.

TABLE 2

90° Peel Strength of Positive Electrode Active Material Layer (N/m)

| | | (S10) PVdF/NMP | | | | |
|---|---|---|---|---|---|---|
| Peel Strength (N/m) | | 0.020 | 0.024 | 0.025 | 0.026 | 0.030 |
| (S20) Water/NMP | 0.0020 | 2.8 | 3.5 | 3.7 | 3.8 | 4.1 |
| | 0.0022 | 2.8 | 3.7 | 3.5 | 3.9 | 4.2 |
| | 0.0069 | 2.9 | 3.7 | 3.6 | 4.2 | 4.2 |
| | 0.0115 | 2.7 | 3.5 | 3.8 | 3.9 | 4 |
| | 0.0120 | 2.6 | 3.5 | 3.5 | 3.8 | 3.9 |

Figure 3:
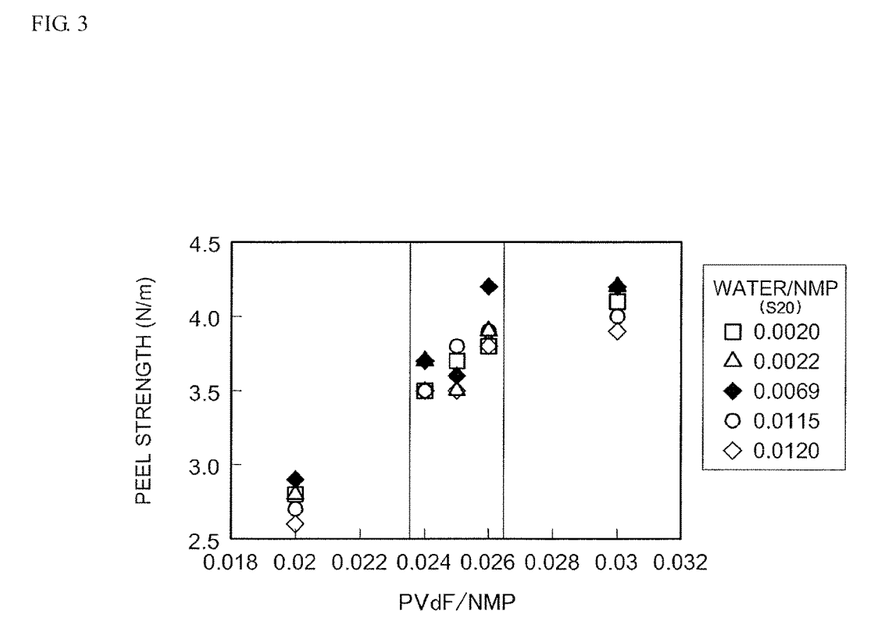
FIG. 3 is a graph indicating the relationship between a material mixing ratio and peel strength of a positive electrode active material layer.

As shown in Table 2 and FIG. 3, peel strength tended to increase as the mass ratio of PVdF/NMP of the first kneading step (S10) increased (or in other words, as the amount of PVdF increased). When considering a practical level of durability, 90° peel strength is preferably roughly 3 N/m or more, and more preferably 3.5 N/m or more, for example. On the basis of the above results, it was determined that the mass ratio of PVdF/NMP in the first kneading step (S10) should be 0.024 or more (and for example, 0.025 or more). Furthermore, the water added in the second kneading step (S20) was not observed to have an effect, and was thought to be removed without problem from the positive electrode active material layer in the above-mentioned drying step.

[Construction of Nonaqueous Electrolyte Secondary Batteries]

Nonaqueous electrolyte secondary batteries were constructed using the 25 types of positive electrodes obtained in the previously described manner. More specifically, a negative electrode active material in the form of amorphous coated graphite (C), a binder in the form of styrene-butadiene rubber (SBR), and a thickener in the form of carboxymethyl cellulose (CMC) were placed in a kneader so that the mass ratio of these materials was such that C:SBR:CMC was 98:1:1, followed by kneading while adjusting viscosity with ion exchange water. This was then coated onto a negative electrode current collector in the form of copper foil followed by drying (drying temperature: 100° C., drying time: 5 minutes) to fabricate a negative electrode.

The positive electrode and negative electrode fabricated in the manner described above were overlapped with a separator (a porous polyethylene (PE) sheet was used here) interposed therebetween to fabricate an electrode body. The electrode body was then housed in a battery case along with a nonaqueous electrolyte (here, an electrolyte was used that was obtained by dissolving a supporting salt in the form of $LiPF_6$ at a concentration of about 1 mol/L in a mixed solvent containing ethylene carbonate (EC), dimethyl carbonate (DMC) and ethyl methyl carbonate (EMC) at a volume ratio of 3:4:3) to construct nonaqueous electrolyte secondary batteries (Examples 1 to 25).

[Measurement of Resistance]

The resistance of the batteries constructed in the manner described above was measured. More specifically, after first charging at a constant current (CC) in a temperature environment at 25° C. and at a rate of ⅓C until the battery voltage reached 4.1 V, charging was carried out at a constant voltage (CV) until the current value reached 1/50C to achieve a fully charged state. Subsequently, the batteries were discharged at a constant current (CC) at a rate of 1/3C until the battery voltage reached 3.0 V, and the CC discharge capacity at that time was taken to be the initial capacity.

Next, CC charging was carried out on the batteries following the discharging at a rate of 1/3C and temperature environment of 25° C. until SOC reached 60% when the initial capacity was 100%. After having adjusted SOC to 60%, the batteries were discharged for 10 seconds at a constant current of 15 C and the voltage drop was measured for 10 seconds. IV resistance (mΩ) was then calculated by dividing the value of this change in voltage (V) by the corresponding current value. The results are shown in Table 3 and FIG. 4.

TABLE 3

Battery Direct Current Resistance (mΩ)

| Direct Current | | (S10) PVdF/NMP | | | | |
|---|---|---|---|---|---|---|
| Resistance (mΩ) | | 0.020 | 0.024 | 0.025 | 0.026 | 0.030 |
| (S20) | 0.0020 | 3.5 | 3.5 | 3.5 | 3.6 | 3.5 |
| Water/NMP | 0.0022 | 3.1 | 2.9 | 2.9 | 2.8 | 3.5 |
| | 0.0069 | 3 | 2.9 | 3 | 2.8 | 3.5 |
| | 0.0115 | 2.8 | 2.8 | 2.9 | 2.9 | 3.6 |
| | 0.0120 | 3.4 | 3.5 | 3.8 | 3.8 | 4 |

Figure 4:
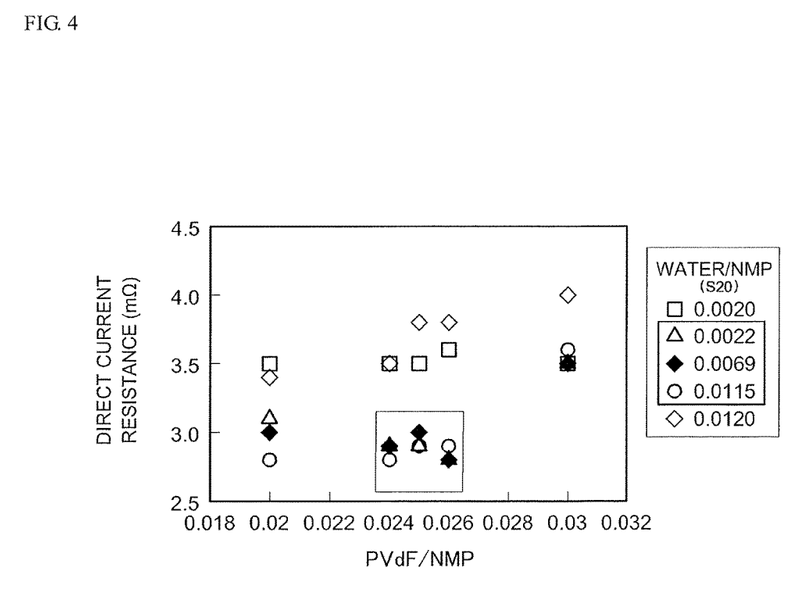
FIG. 4 is a graph indicating the relationship between a material mixing ratio and battery resistance.

As is shown in Table 3 and FIG. 4, based on the results of this study, it was determined that direct current resistance can be lowered by adding a prescribed amount of water in the second kneading step in comparison with the case of not adding water. This is thought to be due to the addition of water promoting gelling of PVdF and resulting in the efficient formation of electrically conductive paths between the positive electrode active material and electrically conductive fine particles. However, if the amount of water added is excessively large, gelling of PVdF proceeds excessively and the electrically conductive fine particles become entangled or curled, and this is thought to prevent efficient coverage of the surface of the positive electrode active material. On the basis of the above results, it was determined that the mass ratio of water/NMP in the second kneading step (S20) should be 0.0022 to 0.0115.

In addition, direct current resistance generally tended to increase as the mass ratio of PVdF/NMP in the first kneading step (S10) became larger (or in other words, when the added amount of PVdF increased). Direct current resistance is more preferably 3 mΩ or less when considering use at high output density in the manner of vehicle-mounted batteries in particular.

On the basis of the above results, it was determined that the mass ratio of PVdF/NMP in the first kneading step (S10) is more preferably 0.024 to 0.026, and that the mass ratio of water/NMP in the second kneading step (S20) is more preferably 0.0022 to 0.0115.

As described above, according to the production method disclosed herein, a positive electrode can be produced that is resistant to separation of the positive electrode active material layer and has low resistance. In addition, use of this positive electrode makes it possible to realize a nonaqueous electrolyte secondary battery having superior output characteristics and durability. These results indicate the technical significance of the present invention.

Although the above-mentioned description has provided a detailed explanation of specific examples of the present invention, these examples are merely intended to be exemplary and do not limit the scope of claim for patent. The technology described in the claims includes various alterations or modifications of the previously indicated specific examples.

REFERENCE SIGNS LIST

10 Positive electrode sheet (positive electrode)
14 Positive electrode active material layer
20 Negative electrode sheet (negative electrode)
24 Negative electrode active material layer
40 Separator sheet (separator)
50 Battery case
52 Battery case body
54 Cover
55 Safety valve
70 Positive electrode terminal
72 Negative electrode terminal
80 Wound electrode body
100 Nonaqueous electrolyte secondary battery

The invention claimed is:

1. A method for producing a nonaqueous electrolyte secondary battery, the method comprising:
a first kneading step for kneading electrically conductive carbon fine particles and a hydrophobic binder that gels when contacted by water, in N-methyl-2-pyrrolidone (NMP);
a second kneading step for adding a positive electrode active material and water to a first kneaded product obtained in the first kneading step followed by additional kneading;
a step for forming a positive electrode active material layer on the surface of a positive electrode current collector by coating a second kneaded product obtained in the second kneading step on the positive electrode current collector to obtain a positive electrode, and
a step for constructing the nonaqueous electrolyte secondary battery using the positive electrode and a negative electrode, wherein
the first kneaded product contains moisture, the ratio of the mass of the moisture to the mass of the NMP is 0.002 or less in the first kneaded product, and
in the second kneading step, the water is added at a mass ratio of 0.0022 to 0.0115 based on the mass of the NMP.

2. The production method according to claim 1, wherein, the ratio of the mass of the hydrophobic binder to the mass of the NMP in the first kneading step is 0.024 to 0.026.

3. The production method according to claim 1, wherein polyvinylidene fluoride (PVdF) is used for the hydrophobic binder.

4. The production method according to claim 1, wherein acetylene black is used for the electrically conductive carbon fine particles.

5. A nonaqueous electrolyte secondary battery, obtained by the production method according to claim 1.

6. The nonaqueous electrolyte secondary battery according to claim 5, wherein peel strength of the positive electrode active material layer from the positive electrode current collector is 3.5 N/m or more.

7. The production method according to claim 1, wherein the amount of the NMP in the first kneading step is 800 to 1200 parts by mass based on 100 parts by mass of the electrically conductive carbon fine particles.

8. The production method according to claim 1, wherein the amount of the NMP in the first kneading step is 900 to 1100 parts by mass based on 100 parts by mass of the electrically conductive carbon fine particles.

9. The production method according to claim 1, wherein the mass ratio of the hydrophobic binder to the electrically conductive carbon fine particles in the first kneading step is 1:2 to 1:6.

10. The production method according to claim 1, wherein the mass ratio of the hydrophobic binder to the electrically conductive carbon fine particles in the first kneading step is 1:3 to 1:5.

11. The production method according to claim 1, wherein the mass ratio of the amount of the hydrophobic binder to the amount of the NMP in the first kneading step is 0.24 to 0.26.

12. The production method according to claim 1, wherein the mass ratio of the positive electrode active material to the electrically conductive carbon fine particles in the second kneading step is normally about 1:0.07 to 1:0.11.

13. The production method according to claim 1, wherein the mass ratio of the positive electrode active material to the electrically conductive carbon fine particles in the second kneading step is normally about 1:0.08 to 1:0.1.

14. The production method according to claim 1, wherein the mass ratio of the positive electrode active material to the hydrophobic binder in the second kneading step is 1:0.01 to 1:0.04.

15. The production method according to claim 1, wherein the mass ratio of the positive electrode active material to the hydrophobic binder in the second kneading step is 1:0.02 to 1:0.03.

16. The production method according to claim 1, wherein
the solid concentration (NV) of the first kneaded product is 5 to 20%, and
the solid concentration (NV) of the second kneaded product is 40 to 80%.

17. The production method according to claim 1, wherein
the solid concentration (NV) of the first kneaded product is 7 to 20%, and
the solid concentration (NV) of the second kneaded product is 50 to 60%.

18. The production method according to claim 1, wherein the positive electrode active material is a stratified or spinel-based lithium compound metal oxide selected from the group consisting of $LiNiO_2$, $LiCoO_2$, $LiMn_2O_4$, $LiFeO_2$, $LiNi_{0.5}Mn_{1.5}O_4$, $LiCrMnO_4$ and $LiFePO_4$.

19. The production method according to claim 1, wherein the negative electrode comprises a negative electrode active material layer on a surface of a negative electrode current collector,
wherein the negative electrode active material layer comprises a negative electrode active material selected from the group consisting of graphite, non-graphitizable carbon and graphitizable carbon.

* * * * *